(12) United States Patent
Szepessy et al.

(10) Patent No.: US 11,702,125 B2
(45) Date of Patent: Jul. 18, 2023

(54) STEER-BY-WIRE ARCHITECTURES

(71) Applicants: THYSSENKRUPP PRESTA AG, Eschen (LI); thyssenkrupp AG, Essen (DE)

(72) Inventors: Imre Szepessy, Mauren (LI); Botond Hamori, Budapest (HU); Peter Kakas, Budapest (HU)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 427 days.

(21) Appl. No.: 16/980,007

(22) PCT Filed: Mar. 14, 2019

(86) PCT No.: PCT/EP2019/056366
§ 371 (c)(1),
(2) Date: Sep. 11, 2020

(87) PCT Pub. No.: WO2019/179859
PCT Pub. Date: Sep. 26, 2019

(65) Prior Publication Data
US 2020/0406954 A1    Dec. 31, 2020

(30) Foreign Application Priority Data

Mar. 22, 2018  (DE) .................... 10 2018 106 872.7

(51) Int. Cl.
*B62D 5/00*  (2006.01)
*B62D 6/00*  (2006.01)
*B62D 5/04*  (2006.01)

(52) U.S. Cl.
CPC ............ *B62D 5/003* (2013.01); *B62D 6/008* (2013.01); *B62D 5/0481* (2013.01)

(58) Field of Classification Search
CPC ....... B62D 5/003; B62D 6/008; B62D 5/0481
See application file for complete search history.

(56) References Cited

U.S. PATENT DOCUMENTS

| 2004/0026158 A1 | 2/2004 | Rieth |
| 2006/0042858 A1 | 3/2006 | Boyle et al. |
| 2006/0080016 A1* | 4/2006 | Kasahara ............... B62D 6/008 701/41 |

(Continued)

FOREIGN PATENT DOCUMENTS

| CN | 1966332 A | 5/2007 |
| CN | 201405922 Y | 2/2010 |

(Continued)

OTHER PUBLICATIONS

English Translation of International Search Report issued in PCT/EP2019/056366, dated Jun. 7, 2019.

*Primary Examiner* — Jacob D Knutson
(74) *Attorney, Agent, or Firm* — thyssenkrupp North America, LLC

(57) ABSTRACT

A steer-by-wire steering system for motor vehicles includes an electronically controlled steering actuator acting on steered wheels of the vehicle responsive to a steering demand and a feedback actuator transmitting retroactive effects of the road to a steering wheel, wherein the feedback actuator and the steering actuator have a redundant power supply.

5 Claims, 4 Drawing Sheets

(56) References Cited

U.S. PATENT DOCUMENTS

| | | | |
|---|---|---|---|
| 2006/0253726 A1* | 11/2006 | Kukshya | G06F 11/202 |
| | | | 714/E11.078 |
| 2007/0137921 A1 | 6/2007 | Kasahara | |
| 2010/0218641 A1 | 9/2010 | Neumann | |
| 2011/0153160 A1 | 6/2011 | Hesseling et al. | |
| 2014/0301097 A1 | 10/2014 | Neumann et al. | |
| 2018/0074497 A1 | 3/2018 | Tsuji et al. | |
| 2018/0093676 A1 | 4/2018 | Emura et al. | |
| 2018/0105185 A1 | 4/2018 | Watanabe et al. | |
| 2018/0257703 A1 | 9/2018 | Dreyer | |
| 2019/0168772 A1 | 6/2019 | Emura et al. | |
| 2021/0253157 A1 | 8/2021 | Hamori et al. | |

FOREIGN PATENT DOCUMENTS

| | | | |
|---|---|---|---|
| CN | 107531252 A | 1/2018 | |
| CN | 108569333 A | 9/2018 | |
| CN | 112334376 A | 2/2021 | |
| DE | 100 42 308 A1 | 11/2001 | |
| DE | 100 53 335 A | 5/2002 | |
| DE | 10053335 A1 * | 5/2002 | ............ B62D 5/001 |
| DE | 101 12 514 A | 6/2002 | |
| DE | 101 35 736 C1 | 4/2003 | |
| DE | 103 40 369 A | 3/2005 | |
| DE | 10 2007 043 005 A1 | 3/2009 | |
| DE | 10 2018 116 367 A | 1/2019 | |
| JP | 5805255 B | 11/2015 | |

* cited by examiner

STEER-BY-WIRE ARCHITECTURES

CROSS REFERENCE TO RELATED APPLICATIONS

This application is a U.S. National Stage Entry of International Patent Application Serial Number PCT/EP2019/056366, filed Mar. 14, 2019, which claims priority to German Patent Application No. DE 10 2018 106 872.7, filed Mar. 22, 2018, the entire contents of both of which are incorporated herein by reference.

FIELD

The present disclosure generally relates to a steer-by-wire steering system for motor vehicles.

BACKGROUND

In steer-by-wire steering systems, the position of the steered wheels is not directly coupled to the steering wheel. There is a connection between the steering wheel and the steered wheels by means of electrical signals. Instead of the mechanical coupling, a steering actuator for positioning the wheels and a feedback actuator are used to simulate the restoring forces on the steering wheel. In order to meet the safety requirements, the steering system must be designed in such a way that the functionality is always present. Mainly because of the costs incurred, an appropriate compromise must be found between the degree of fault tolerance and the number of redundant components.

Thus, a need exists for a steer-by-wire steering system for motor vehicles which always operates reliably in order to meet the safety objectives.

DETAILED DESCRIPTION

Figure 1:
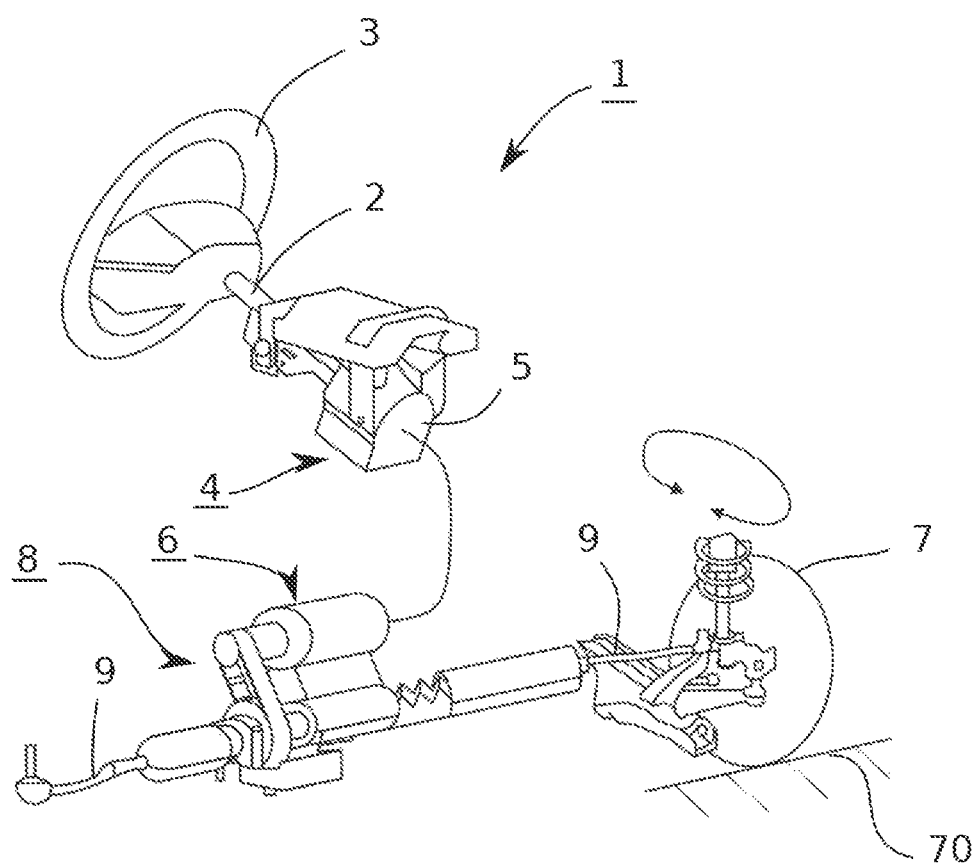
FIG. 1 is a schematic view of a steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a steer-by-wire steering system for motor vehicles.

Accordingly, a steer-by-wire steering system for motor vehicles is provided comprising an electronically controlled steering actuator acting on the steered wheels depending on a driver's steering demand, and a feedback actuator transmitting the retroactive effect of the road to a steering wheel, wherein the feedback actuator and the steering actuator have a redundant power supply. In the event of a power failure, the steering system can therefore continue to work reliably.

It is preferred that the feedback actuator and the steering actuator are each connected to a first power supply and a second power supply.

Preferably, the two power supplies are designed in such a way that in the event of a failure of one of the two power supplies the other power supply ensures that the feedback actuator and the steering actuator can continue to be operated.

In one embodiment, two redundant motor vehicle communication channels are additionally provided, by means of which the feedback actuator communicates with both the motor vehicle and the steering actuator.

However, it may also be advantageous to provide two redundant private communication channels by means of which the feedback actuator communicates exclusively with the steering actuator. In this case, two redundantly designed motor vehicle communication channels are preferably provided, by means of which the feedback actuator communicates with the motor vehicle, wherein the motor vehicle communication channels and the private communication channels are designed such that the feedback actuator transmits relevant signals from the motor vehicle to the steering actuator and vice versa.

In a further embodiment, however, it may also be provided that the steering actuator communicates with the motor vehicle by means of the two redundantly designed motor vehicle communication channels. In this case, the motor vehicle communication channels and the private communication channels between the feedback actuator and the steering actuator are designed for the steering actuator to transmit relevant signals from the motor vehicle to the feedback actuator and vice versa.

A steer-by-wire steering 1 is shown in FIG. 1. A rotation angle sensor that is not shown and which is attached to a steering shaft 2 detects the driver steering torque applied by turning the steering wheel 3. Furthermore, a feedback actuator 4 which is attached to the steering shaft 2 is used to transmit the retroactive effects from the roadway 70 to the steering wheel 3 and thus to give the driver feedback about the steering behavior and the driving behavior of the vehicle. The driver's steering demand is transmitted to a control unit 5 via the rotation angle of the steering shaft 2 which is measured by the rotation angle sensor and via signal lines. The control unit 5 controls an electric steering actuator 6, also called a steering actuator, which controls the position of the steered wheels 7 depending on the signal from the rotation angle sensor as well as other input variables, such as vehicle speed, yaw rate and the like. The steering actuator 6 causes an axial displacement of a rack rod by means of a threaded drive 8. The steered wheels 7 are connected to the rack rod via tie rods 9.

Figure 2:
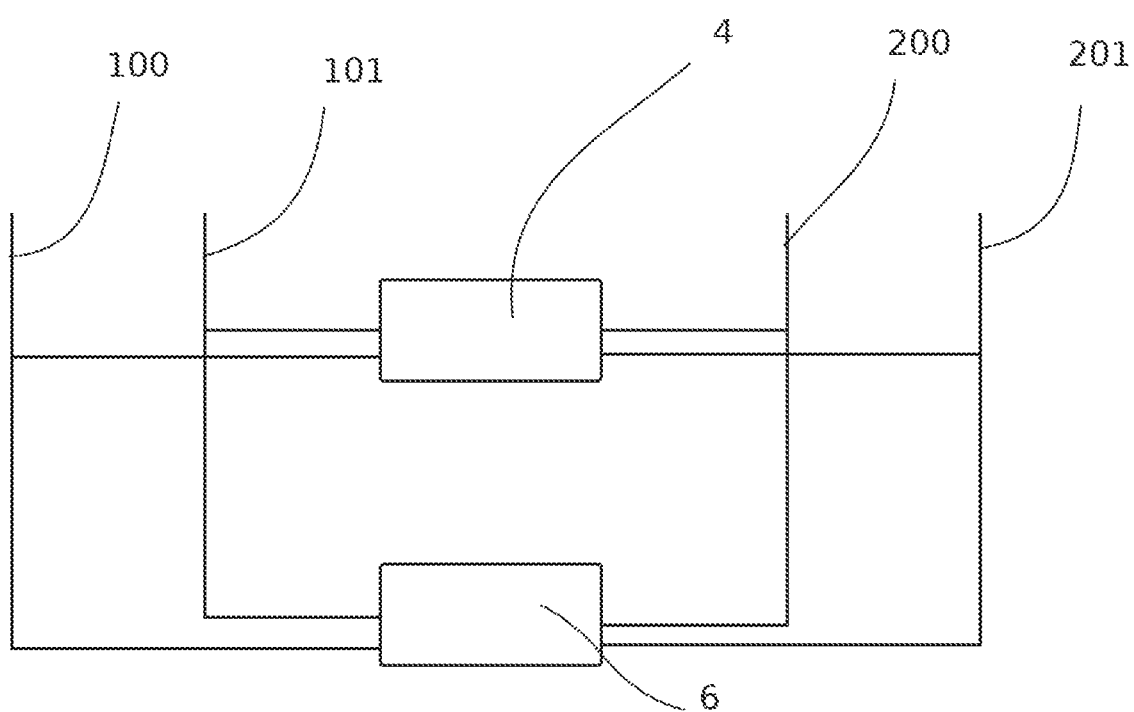
FIG. 2 is a block diagram of an architecture of the steer-by-wire steering system.

FIG. 2 shows a first embodiment of a cabling architecture for a steer-by-wire steering system. The feedback actuator 4 communicates on two vehicle communication channels 100, 101 with both the motor vehicle and the steering actuator 6. All required signals are transmitted on both vehicle communication channels 100,101 between the motor vehicle and the steer-by-wire system 1 and between the steering actuator 6 and the feedback actuator 4. The two motor vehicle communication channels 100,101 are designed redundantly. In the event of a failure of one of the motor vehicle communication channels 100,101, the other motor vehicle communication channel 100,101 can take over the communication completely, so that the system can continue to operate properly.

Furthermore, a redundant power supply is provided for both the feedback actuator 4 and the steering actuator 6. The feedback actuator 4 and the steering actuator 6 are each connected to a first power supply 200 and a second power supply 201. In the event of a failure of one of the two power supplies 200,201, the other, fault-free power supply 200,201 ensures that the feedback actuator 4 and the steering actuator 6 can continue to operate.

Figure 3:
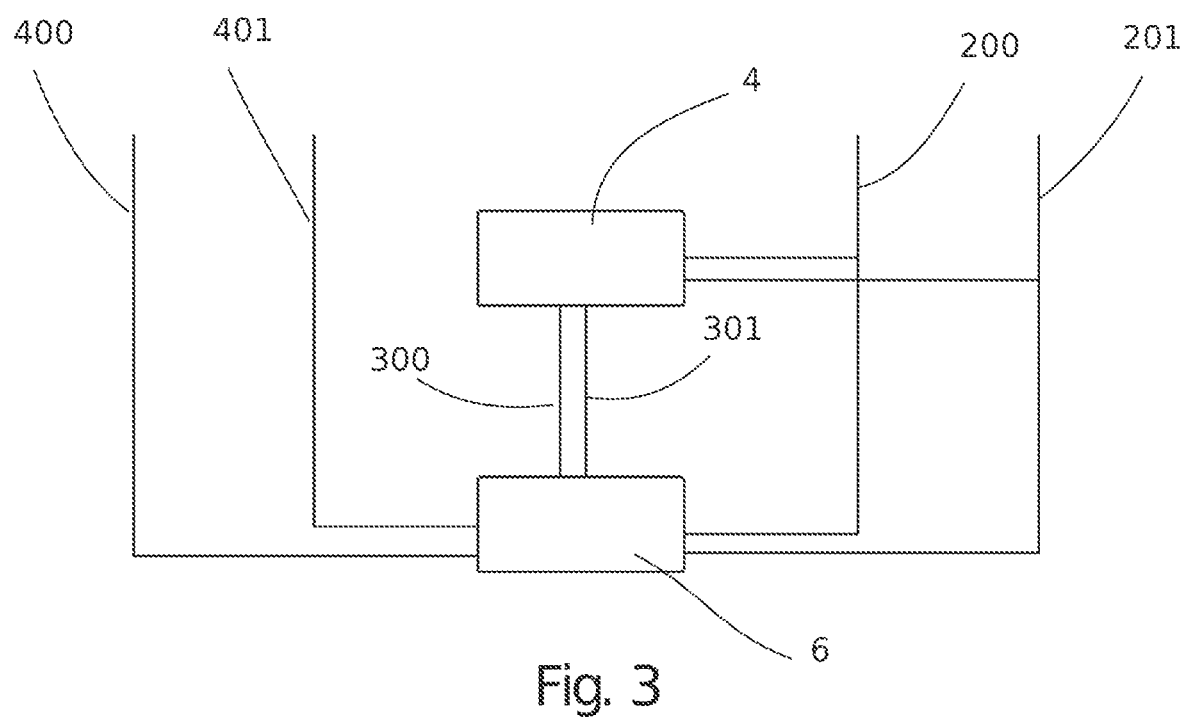
FIG. 3 is a block diagram of a second architecture of the steer-by-wire steering system.

FIG. 3 shows a second embodiment of a cabling architecture for a steer-by-wire steering system. The feedback actuator 4 communicates with the steering actuator 6 on two redundant private communication channels 300,301. In the event of a failure of one private communication channel 300,301, the system can access the second private communication channel 300,301, which also transmits all signals needed to operate the steer-by-wire steering system. The steering actuator 6 communicates with the motor vehicle via the motor vehicle communication network and transmits the relevant signals from the motor vehicle to the feedback actuator 4 and vice versa by means of the private communication channels 300,301. For this purpose, two redundantly designed motor vehicle communication channels 400,401 are provided. In the event of a failure of one of the motor vehicle communication channels 400,401, the other motor vehicle communication channel 400,401 can take over the communication completely, so that the system can continue to operate properly. The feedback actuator 4 does not have a direct communication channel to the motor vehicle. It always communicates with the motor vehicle via the steering actuator 6.

Furthermore, a redundant power supply is provided for both the feedback actuator 4 and the steering actuator 6. The feedback actuator 4 and the steering actuator 6 are each connected to a first power supply 200 and a second power supply 201. In the event of a failure of one of the two power supplies 200,201, the other, fault-free power supply 200,201 ensures that the feedback actuator 4 and the steering actuator 6 can continue to operate.

Figure 4:
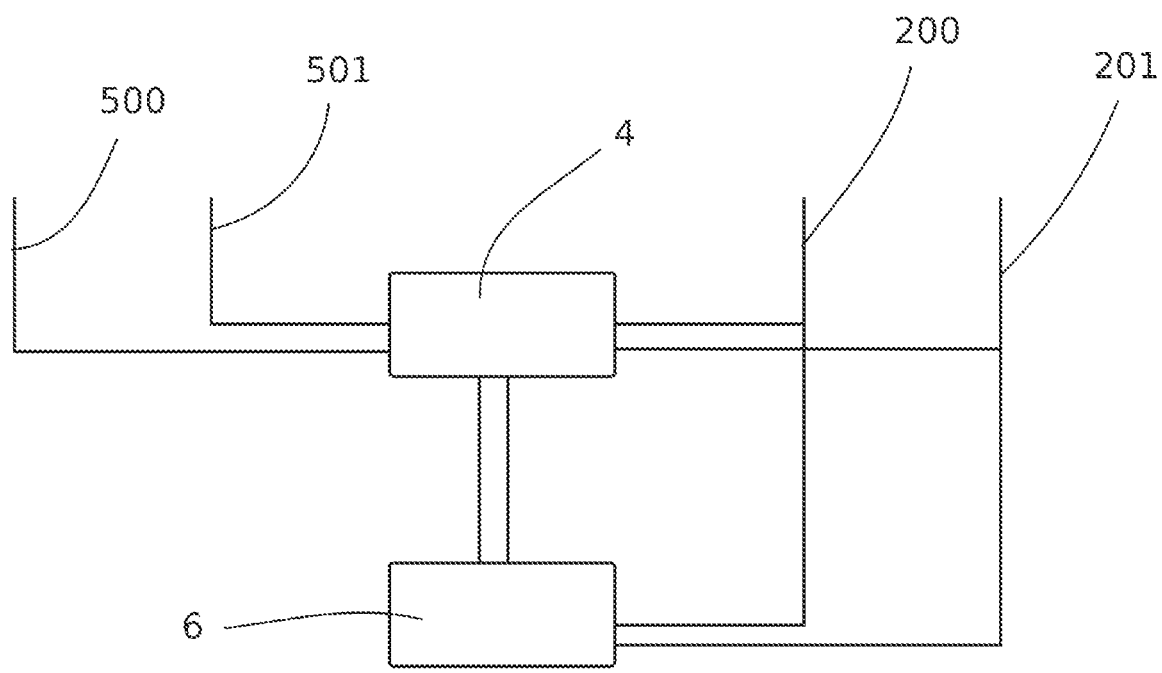
FIG. 4 is a block diagram of a third architecture of the steer-by-wire steering system.

FIG. 4 shows a third embodiment of a cabling architecture for a steer-by-wire steering system. The feedback actuator 4 communicates with the steering actuator 6 on two redundant, private communication channels 300,301. In the event of a failure of one private communication channel 300,301, the system can access the second private communication channel 300,301, which also transmits all signals needed to operate the steer-by-wire steering system. The feedback actuator 4 communicates with the motor vehicle via the motor vehicle communication network and transmits the relevant signals from the motor vehicle to the steering actuator 6 and vice versa via the private communication channels 300,301. For this purpose, two redundantly designed motor vehicle communication channels 500,501 are provided. In the event of a failure of one of the motor vehicle communication channels 500,501, the other motor vehicle communication channel 500,501 can take over the communication completely, so that the system can continue to operate properly. The steering actuator 6 does not have a direct communication channel to the motor vehicle. It always communicates with the motor vehicle via the feedback actuator 4.

Furthermore, a redundant power supply is provided for both the feedback actuator 4 and the steering actuator 6. The feedback actuator 4 and the steering actuator 6 are each connected to a first power supply 200 and a second power supply 201. In the event of a failure of one of the two power supplies 200,201, the other, fault-free power supply 200,201 ensures that the feedback actuator 4 and the steering actuator 6 can continue to operate.

What is claimed is:

1. A steer-by-wire steering system for a motor vehicle with steered wheels, the steering system comprising:
   an electronically controlled steering actuator acting on the steered wheels, the steering actuator configured to act on the steered wheels responsive to a steering demand, and
   a feedback actuator configured to transmit retroactive effects of a road to a steering wheel,
   wherein the feedback actuator and the steering actuator have a redundant power supply, and wherein the steer-by-wire steering system comprises two redundant private communication channels, by means of which the feedback actuator communicates with the steering actuator, and wherein the steer-by-wire steering system comprises two redundantly configured motor vehicle communication channels, by means of which the feedback actuator communicates with the motor vehicle, wherein the motor vehicle communication channels and the private communication channels are designed such that the feedback actuator transmits relevant signals from the motor vehicle to the steering actuator and from the steering actuator to the motor vehicle.

2. The steer-by-wire steering system of claim 1 wherein the feedback actuator and the steering actuator are each connected to a first power supply and a second power supply of the redundant power supply.

3. The steer-by-wire steering system of claim 1 wherein the two power supplies are configured such that in the event of a failure of one of the two power supplies, the feedback actuator and the steering actuator are continued to be operated by the respective other power supply.

4. The steer-by-wire steering system of claim 1 wherein the steer-by-wire steering system comprises two redundant motor vehicle communication channels by means of which the feedback actuator communicates with both the motor vehicle and the steering actuator.

5. A steer-by-wire steering system for motor vehicles with steered wheels, the steering system comprising:
   an electronically controlled steering actuator acting on the steered wheels, the steering actuator configured to act on the steered wheels responsive to a steering demand, and
   a feedback actuator configured to transmit retroactive effects of a road to a steering wheel,
   wherein the feedback actuator and the steering actuator have a redundant power supply, and wherein the steer-by-wire steering system comprises two redundant private communication channels, by means of which the feedback actuator communicates with the steering actuator, and wherein the steer-by-wire steering system comprises two redundantly designed motor vehicle communication channels by which the steering actuator communicates with the motor vehicle, wherein the motor vehicle communication channels and the private communication channels are configured such that the steering actuator transmits relevant signals from the motor vehicle to the feedback actuator and from the feedback actuator to the motor vehicle.

\* \* \* \* \*